US012386390B1

(12) United States Patent
Gu

(10) Patent No.: US 12,386,390 B1
(45) Date of Patent: Aug. 12, 2025

(54) SPLIT-SCREEN DISPLAY DEVICE FOR LAPTOP COMPUTER

(71) Applicant: Shenzhen E-Tech Digital Technology Co., Ltd., ShenZhen (CN)

(72) Inventor: Yang Gu, ShenZhen (CN)

(73) Assignee: SHENZHEN E-TECH DIGITAL TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/740,173

(22) Filed: Jun. 11, 2024

(30) Foreign Application Priority Data

May 13, 2024 (CN) .......................... 202421034392.9

(51) Int. Cl.
*G06F 1/16* (2006.01)

(52) U.S. Cl.
CPC .......... *G06F 1/1641* (2013.01); *G06F 1/1632* (2013.01); *G06F 1/1681* (2013.01)

(58) Field of Classification Search
CPC ..... G06F 1/1641; G06F 1/1632; G06F 1/1681
See application file for complete search history.

(56) References Cited

U.S. PATENT DOCUMENTS

| 2015/0227175 | A1* | 8/2015 | Motosugi | G06F 1/1618 16/341 |
| 2016/0205792 | A1* | 7/2016 | Ahn | G06F 1/1652 40/779 |
| 2022/0083102 | A1* | 3/2022 | Nishioka | H04M 1/0216 |

* cited by examiner

*Primary Examiner* — Robert J Michaud
(74) *Attorney, Agent, or Firm* — Muncy, Geissler, Olds & Lowe, P.C.

(57) ABSTRACT

The present application relates to a split-screen display device for a laptop computer. The first screen and the second screen are provided on the left and right sides of the middle plate member, respectively; and the middle plate member forms a hinge connection with the first screen on one side by a first biaxial hinge assembly, and the middle plate member forms a hinge connection with the second screen on the other side by a second biaxial hinge assembly, wherein when the split-screen display device is in a completely folded state, the first screen is folded on a front face of the middle plate member and the second screen is folded on a back face of the first screen. When completely folded, both the first screen and the second screen have their display faces covered and protected, thus reducing the risk that the display faces are damaged.

11 Claims, 10 Drawing Sheets

SPLIT-SCREEN DISPLAY DEVICE FOR LAPTOP COMPUTER

TECHNICAL FIELD

The present application relates to an extended display for a laptop computer, and more particularly to a split-screen display device for a laptop computer.

BACKGROUND ART

Laptop computers have become one of the indispensable tools in modern life. With the advancement of technology, laptop computers have gradually become thinner, lighter and more portable, and their performance has been significantly improved. As office needs increase, so does the need for multi-tasking and efficient work among laptop computer users. To fulfill this need, split-screen displays for laptop computers have appeared on the market. A split-screen display for a laptop computer is usually externally connected to the screen of the laptop computer, and after it is connected to the laptop computer, the system screen extension is achieved, and the user can then use multiple screens at the same time to display multiple task windows, respectively, thereby facilitating multi-tasking for users and improving the work efficiency.

Some split-screen displays for laptop computers come with left and right screens, with a bracket being provided between the two screens and the two screens being rotationally connected to the bracket on the two sides, respectively. When folding this split-screen display, the two screens are typically rotated separately, one forward and one backward, so that when completely folded, the two screens are located in front of and behind the bracket, respectively. Since the display faces of the two screens both face forward in the unfolded state, after rotating and folding one of them forward and one of them backward, there will be one screen with the display face facing outward, resulting in the risk of the exposed display face being crushed and scratched when it is in storage or when it is carried for transportation, and thus an improvement is needed.

SUMMARY

The objective of the present application is to overcome the above deficiencies of the prior art and to provide a split-screen display device for a laptop computer to reduce the risk of the screen being damaged.

In order to achieve the above objective, the present application provides the following technical solution: a split-screen display device for a laptop computer, comprising a middle plate member, a first screen, and a second screen, wherein the middle plate member is used to connect the first screen and the second screen, and the first screen and the second screen are provided on the left and right sides of the middle plate member, respectively; the middle plate member forms a hinge connection with the first screen on one side by a first biaxial hinge assembly, and the middle plate member forms a hinge connection with the second screen on the other side by a second biaxial hinge assembly, wherein when the split-screen display device is in a completely folded state, the first screen is folded on a front face of the middle plate member and a display face of the first screen faces the front face of the middle plate member, and the second screen is folded on a back face of the first screen and a display face of the second screen faces the back face of the first screen.

In the present application, biaxial hinges are used to connect the middle plate member with the display screens on both sides, so that the degree of freedom of rotational activity of the split screens is improved, and when completely folded, the first screen has its display face covered and obscured by the middle plate member and the second screen has its display face covered and obscured by the first screen, which means that both the first screen and the second screen have their display faces covered and protected, so there is no exposure of the display faces, thus reducing the risk that the display faces are damaged when they are in storage or when they are carried for transportation, and improving the protection of the display screen.

The above description is merely an overview of the technical solution of the present application. In order to understand the technical means of the present application more clearly, it can be implemented in accordance with the content of the specification, and in order to make the above and other purposes, features and advantages of the present application more obvious and easier to understand, preferred embodiments are specifically cited below, which are described in detail as follows.

Figure 1:
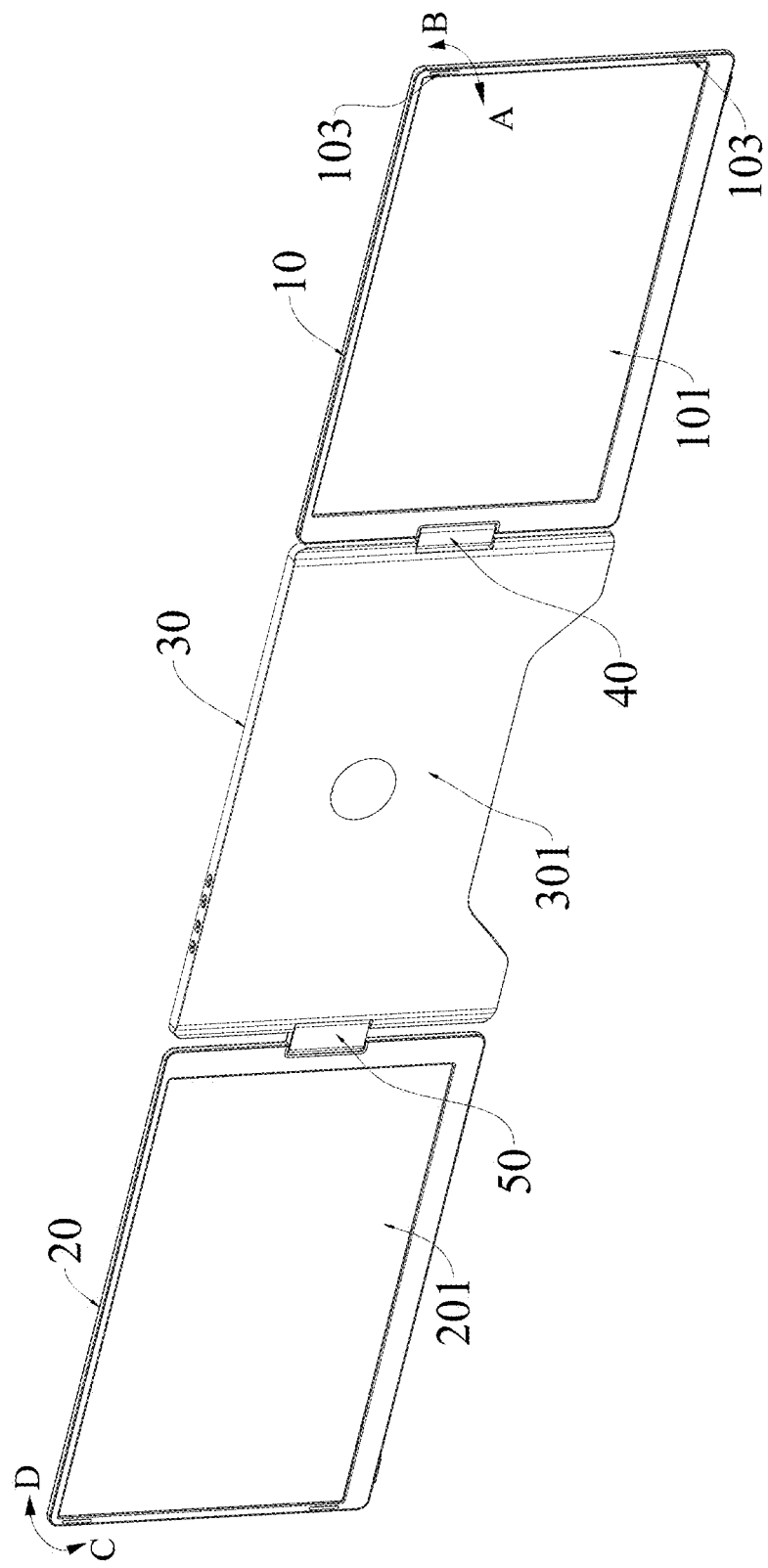
FIG. 1 is a three-dimensional view of a split-screen display device in a completely unfolded state.

It should be noted that the products shown in the above views have been appropriately reduced/enlarged to adapt to the size of the drawing and the clarity of the view, and there are no restrictions on the sizes of the products shown in the views.

DETAILED DESCRIPTION OF EMBODIMENTS

In order to make the purpose, technical solution and advantages of the present application clearer, the present application will be further described in detail below in conjunction with the accompanying drawings and specific embodiments.

The technical solution of the embodiments of the present application will be described below clearly and comprehensively in conjunction with the drawings of the embodiments of the present application. Clearly, the embodiments described are merely some embodiments of the present application and are not all the possible embodiments. Based on the embodiments given in the present application, all other embodiments that would be obtained by those skilled in the art without expending inventive effort shall all fall within the scope of protection of the present application.

Reference to "embodiment" herein means that particular features, structures, or characteristics described in conjunction with the embodiment may be included in at least one embodiment of the present application. The presence of this phrase at various locations in the specification does not necessarily all refer to the same embodiment, nor is it a separate or alternative embodiment that is mutually exclusive with other embodiments. It is understood by those skilled in the art, both explicitly and implicitly, that the embodiments described herein may be combined with other embodiments.

An embodiment of the present application is a split-screen display device for a laptop computer, the specific structure of which is shown in FIGS. 1-10.

In the embodiment, as shown in FIG. 1, the split-screen display device includes a middle plate member 30, a first screen 10, and a second screen 20. The middle plate member 30 is used to connect the first screen 10 and the second screen 20, and the first screen 10 and the second screen 20 are provided on the left and right sides of the middle plate member 30, respectively. In the embodiment, the normal direction of the front face 301 of the middle plate member 30 is used as the front. The split-screen display device in FIG. 1 is in a completely unfolded state, wherein the angle between the first screen 10 and the second screen 20 is 180 degrees, and the display face 101 of the first screen 10 and the display face 201 of the second screen 20 are both facing forward. As shown in FIG. 1, the middle plate member 30 forms a hinge connection with the first screen 10 on one side by a first biaxial hinge assembly 40, and the middle plate member 30 forms a hinge connection with the second screen 20 on the other side by a second biaxial hinge assembly 50. During use, the first screen 10 may be rotated horizontally relative to the first biaxial hinge assembly 40 (forward in the direction A or backward in the direction B), and the first screen 10 may also be rotated horizontally simultaneously with the first biaxial hinge assembly 40 relative to the middle plate member 30 (forward in the direction A or backward in the direction B). Similarly, during use, the second screen 20 may be rotated horizontally relative to the second biaxial hinge assembly 50 (forward in the direction C or backward in the direction D), and the second screen 20 may also be rotated horizontally simultaneously with the second biaxial hinge assembly 50 relative to the middle plate member 30 (forward in the direction C or backward in the direction D). As can be seen, the split-screen display device uses biaxial hinges to connect the middle plate member 30 with the first screen 10 and the second screen 20 on both sides, so that the degree of freedom of rotational activity of the first screen 10 and the second screen 20 is improved.

Figure 2:
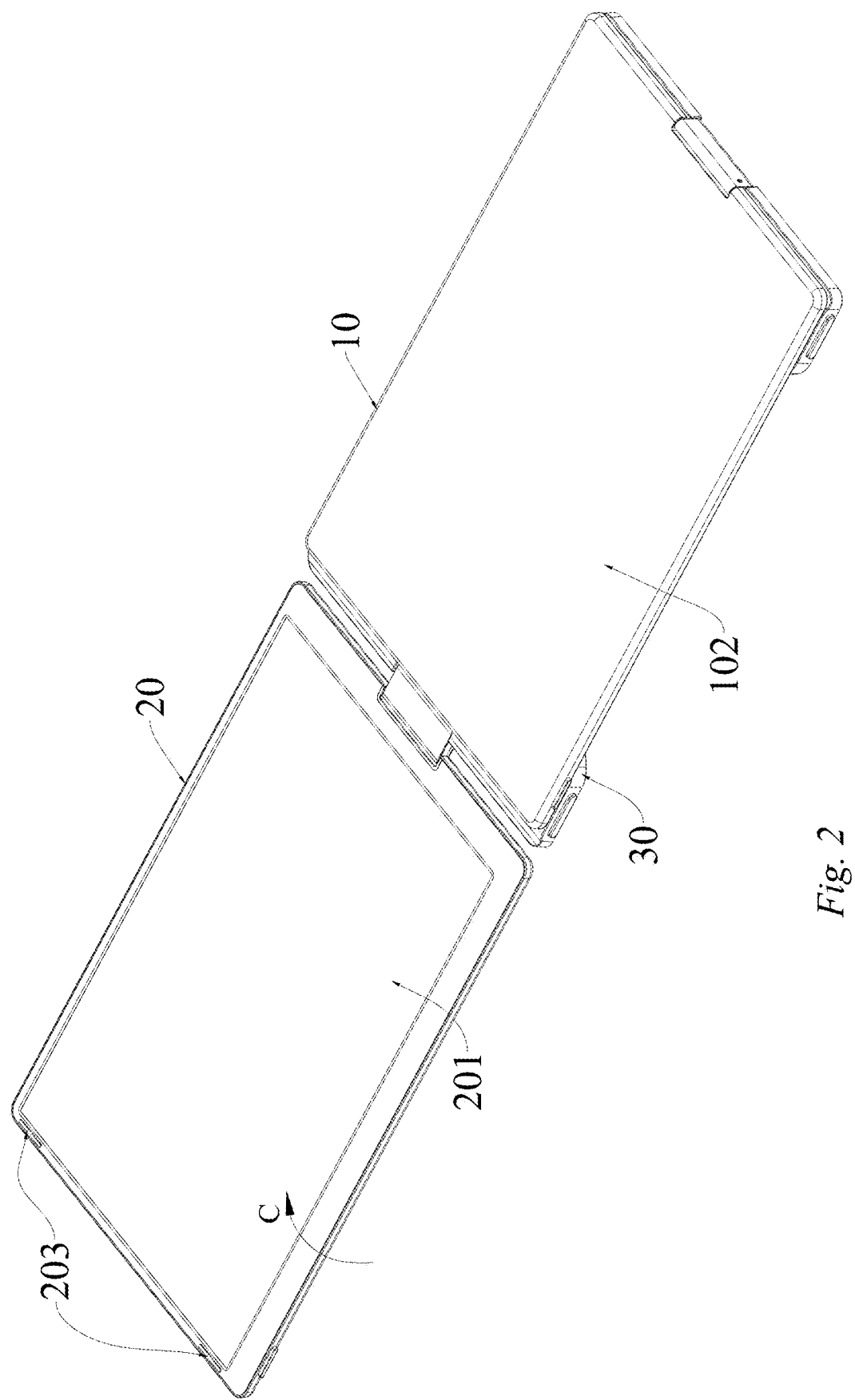
FIG. 2 is a three-dimensional view of the split-screen display device when a first screen is folded.
Figure 3:
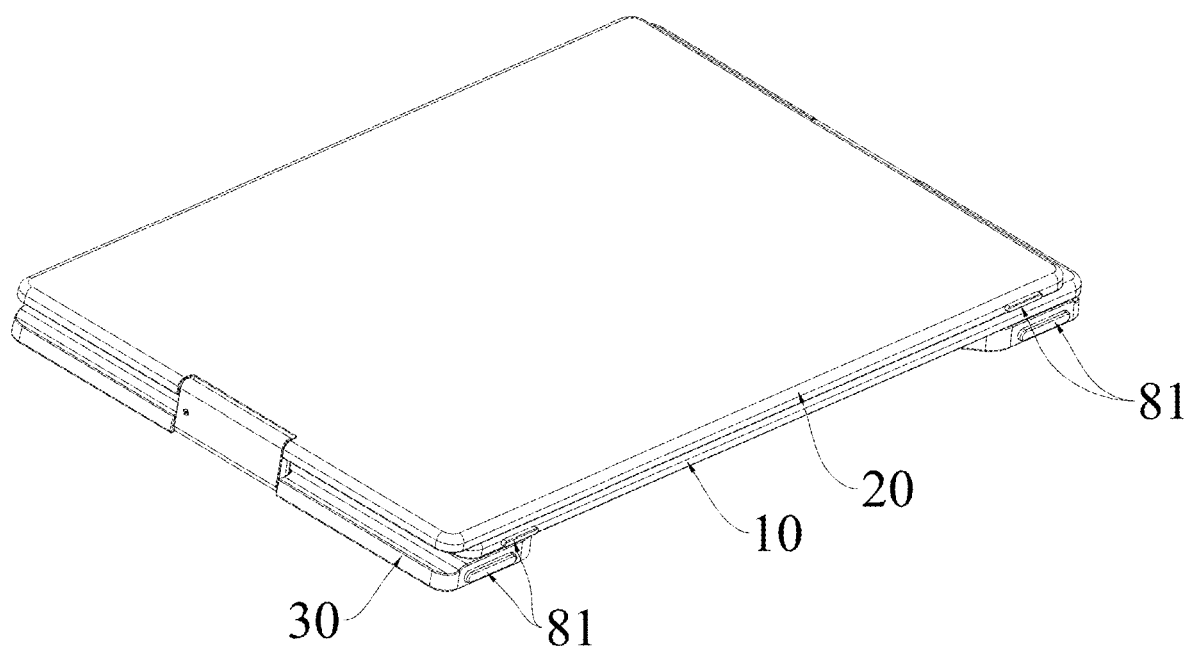
FIG. 3 is a three-dimensional view of the split-screen display device when it is completely folded.

When the split-screen display device in FIG. 1 needs to be folded, the first screen 10 is first rotated in the direction A until the first screen 10 is folded on the front face 301 of the middle plate member 30, at which time the display face 101 of the first screen 10 is facing the front face 301 of the middle plate member 30, thus resulting in the state as shown in FIG. 2. When the split-screen display device in the state of FIG. 2 is further folded, the second screen 20 is rotated in the direction C until the second screen 20 is folded on the back face 102 of the first screen 10, at which time the display face 201 of the second screen 20 is facing the back face 102 of the first screen 10, thus resulting in the state as shown in FIG. 3. The split-screen display device of FIG. 3 is in a completely folded state, in which case the display face of the first screen 10 will be covered and obscured by the middle plate member 30 and the display face of the second screen 20 will be covered and obscured by the first screen 10, which means that the display faces of both the first screen 10 and the second screen 20 are covered and protected so that there is no exposure of the display faces, thus reducing the risk that the display faces are damaged when they are in storage or when they are carried for transportation, and improving the protection of the screen.

As shown in FIG. 1, there are two, up and down, buffer strips 103 fixed on the right side of the first screen 10, wherein when the first screen 10 is folded on the front face 301 of the middle plate member 30, the buffer strips 103 can then avoid direct contact between the first screen 10 and the front face 301 of the middle plate member 30, which avoids scratches on the surfaces of the first screen 10 and the middle plate member 30 and helps to mitigate the impact on the electronic components inside. Similarly, as shown in FIG. 2, there are also two buffer strips 203 fixed on the left side of the second screen 20, wherein the buffer strips 203 can avoid direct contact between the second screen 20 and the first screen 10, which avoids scratches on the surfaces of the second screen 20 and the first screen 10 and helps to mitigate the impact on the electronic components inside.

Figure 4:
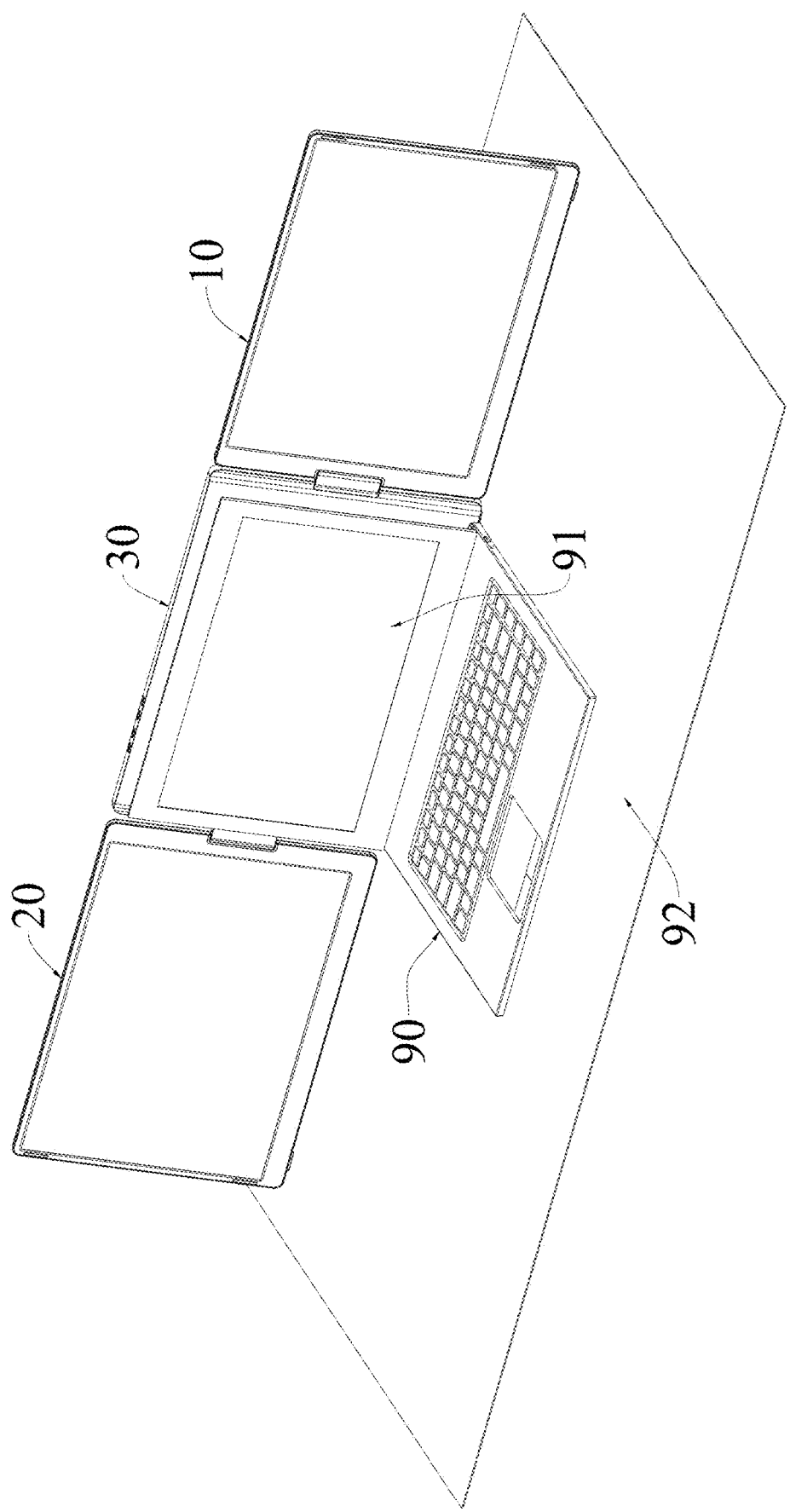
FIGS. 4 and 5 are both schematic diagrams of a state in which the split-screen display device is used in cooperation with a laptop computer.
Figure 5:
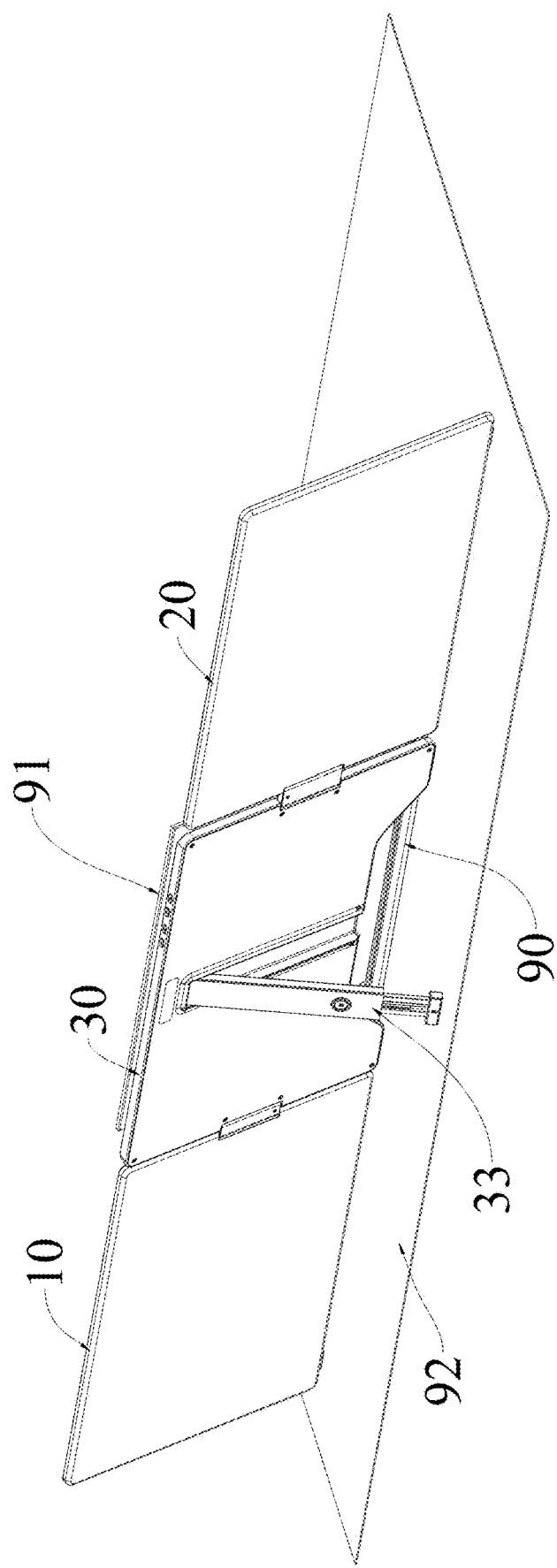

FIGS. 4 and 5 are schematic diagrams of a situation in which the split-screen display device of the embodiment is used in cooperation with a laptop computer 90. The middle plate member 30 is placed behind a screen 91 of the laptop computer 90, and the first screen 10 and the second screen 20 are exactly located on two sides of the screen of the laptop computer, and after connecting the split-screen display device to the corresponding interface of the laptop computer 90 via a wire harness, the user can perform tasks with multiple windows on the three screens at the same time.

In the embodiment, the middle plate member 30 is not clamped or fixed behind the screen 91 of the laptop computer 90, and thus the middle plate member 30 does not have to be designed with a structure related to clamping the screen 91 of the laptop computer 90, which is conducive to reducing the thickness of the middle plate member 30, and thus also reducing the overall thickness and volume of the split-screen display device after it is completely folded. Since the middle plate member 30 is not fixed to the screen 91 of the laptop computer 90, the middle plate member 30, the first screen 10, and the second screen 20 all need to be placed on a plane 92 (e.g., a desktop); therefore, the bottom edges of the middle plate member 30, the first screen 10, and the second screen 20 separately have buffer strips 81 fixed to them (see FIG. 3), which function to avoid generating scratches and to reduce impact. Since the middle plate member 30 need not be fixed to the screen 91 of the laptop computer 90, during actual use, the split-screen display device is not limited to being placed on the back face of the laptop computer 90 for use, and after the split-screen display device has been connected to the laptop computer 90 via the wire harness, the split-screen display device of the embodiment can be placed at any position and in any orientation according to the specific usage requirements within the range allowed by the length of the wire harness.

The middle plate member 30 of the split-screen display device is not horizontally retractable, and the horizontal dimension of the middle plate member 30 may be set to be no less than the horizontal dimensions of the screens of the prevailing laptop computers in order to adapt to different sizes of laptop computers. For example, if the common screen sizes of the prevailing laptop computers are 13-17 inches, the horizontal size of the middle plate member 30 should be no less than the horizontal size of the screen of a 17-inch laptop computer. Alternatively, the manufacturer produces split-screen display devices of different sizes based on different sizes of laptop computers for consumers to choose and purchase. For example, a 13-inch split-screen display device corresponds to a 13-inch laptop computer, wherein the horizontal dimension of the middle plate member 30 is not less than the horizontal dimension of the screen of the 13-inch laptop computer.

As shown in FIG. 5, since the middle plate member 30 does not have to be fixed to the screen 91 of the laptop computer 90, it is necessary to flip a retractable support leg 33 located behind the middle plate member 30 backward and stretch it downwardly to the plane 92 when in use, in which case the support leg 33 provides a support force for the split-screen display device so that the split-screen display device can be stably placed. The specific structure of the retractable support leg 33 belongs to the prior art and will not be repeated here.

Figure 6:
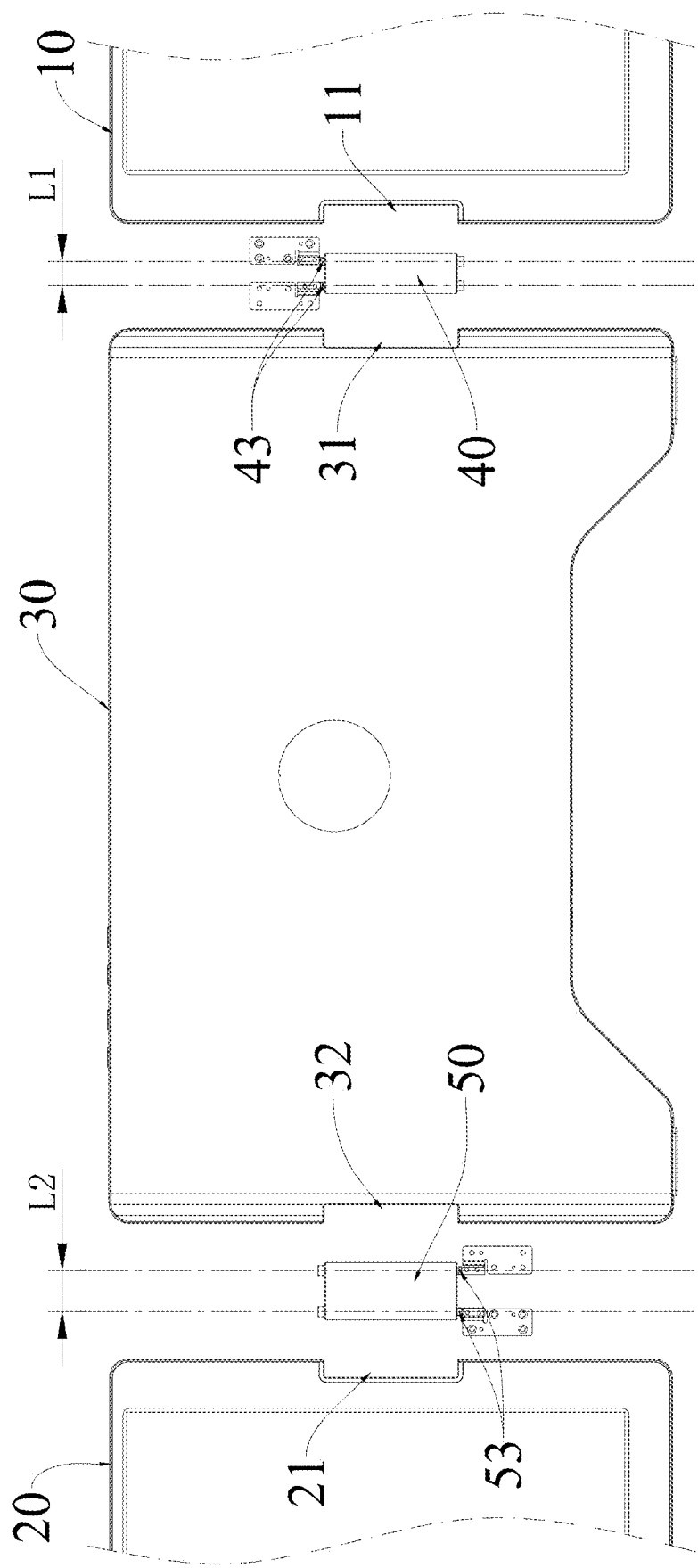
FIG. 6 is an exploded view of the split-screen display device.

In some embodiments, as shown in FIG. 6, the middle plate member 30 is provided with a first recess 31 on one side and the first screen 10 is correspondingly provided with a second recess 11 on one side connected to the middle plate member 30, a part of the first biaxial hinge assembly 40 being located in the first recess 31 and hinged to the first recess 31, and a part of the first biaxial hinge assembly 40 being located in the second recess 11 and hinged to the second recess 11. The two sides of the first biaxial hinge assembly 40 are placed in the first recess 31 and the second recess 11, respectively, thus reducing the distance between the first screen 10 and the middle plate member 30 when completely unfolded, which facilitates the reduction of the overall lateral dimension while avoiding the exposure of the hinge structure. As shown in FIG. 6, the middle plate member 30 is provided with a third recess 32 on the other side and the second screen 20 is correspondingly provided with a fourth recess 21 on one side connected to the middle plate member 30, a part of the second biaxial hinge assembly 50 being located in the third recess 32 and hinged to the third recess 32, and a part of the second biaxial hinge assembly 50 being located in the fourth recess 21 and hinged to the fourth recess 21. The two sides of the second biaxial hinge assembly 50 are placed in the third recess 32 and the fourth recess 21, respectively, thus reducing the distance between the second screen 20 and the middle plate member 30 when completely unfolded, which facilitates the reduction of the overall lateral dimension while avoiding the exposure of the hinge structure.

In some embodiments, as shown in FIG. 6, the first biaxial hinge assembly 40 has two parallel rotating shafts 43 and a distance between the two rotating shafts 43 is a first width L1, and the second biaxial hinge assembly 50 has two parallel rotating shafts 53 and a distance between the two rotating shafts 53 is a second width L2. The first width L1 is less than the second width L2 and the difference between the two is not less than the thickness of the first screen 10, and a better embodiment is that the first width L1 is less than the second width L2 and the difference between the two is equal to the thickness of the first screen 10, so that when the split-screen display device is in the completely folded state, the end of the second screen 20 that is far from the second biaxial hinge assembly 50 will then not be warped, and the folding of the second screen 20 is flatter, resulting in a better use experience.

Figure 7:
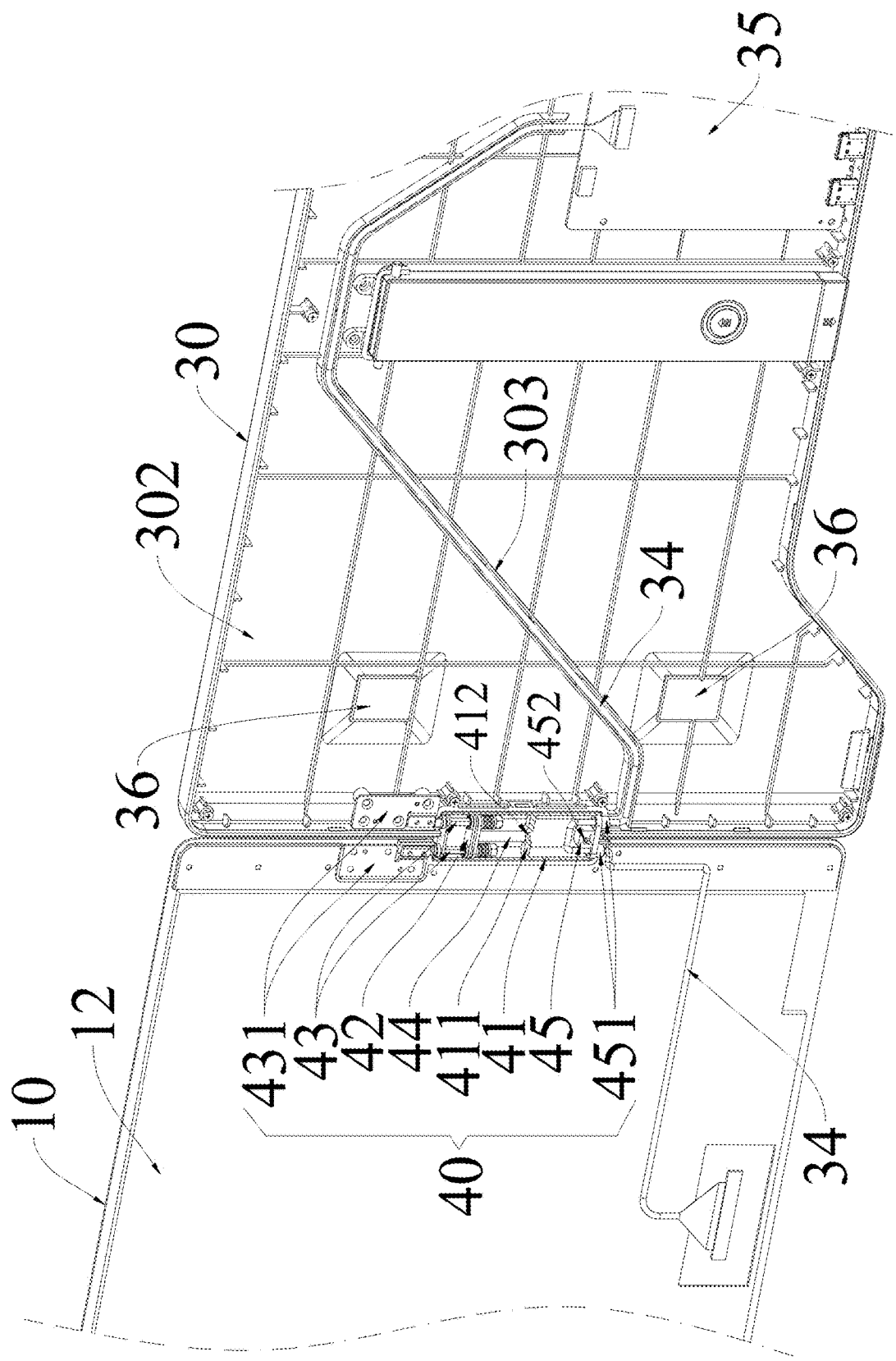
FIG. 7 is an internal structure view of the first screen and a middle bracket (rear view).
Figure 8:
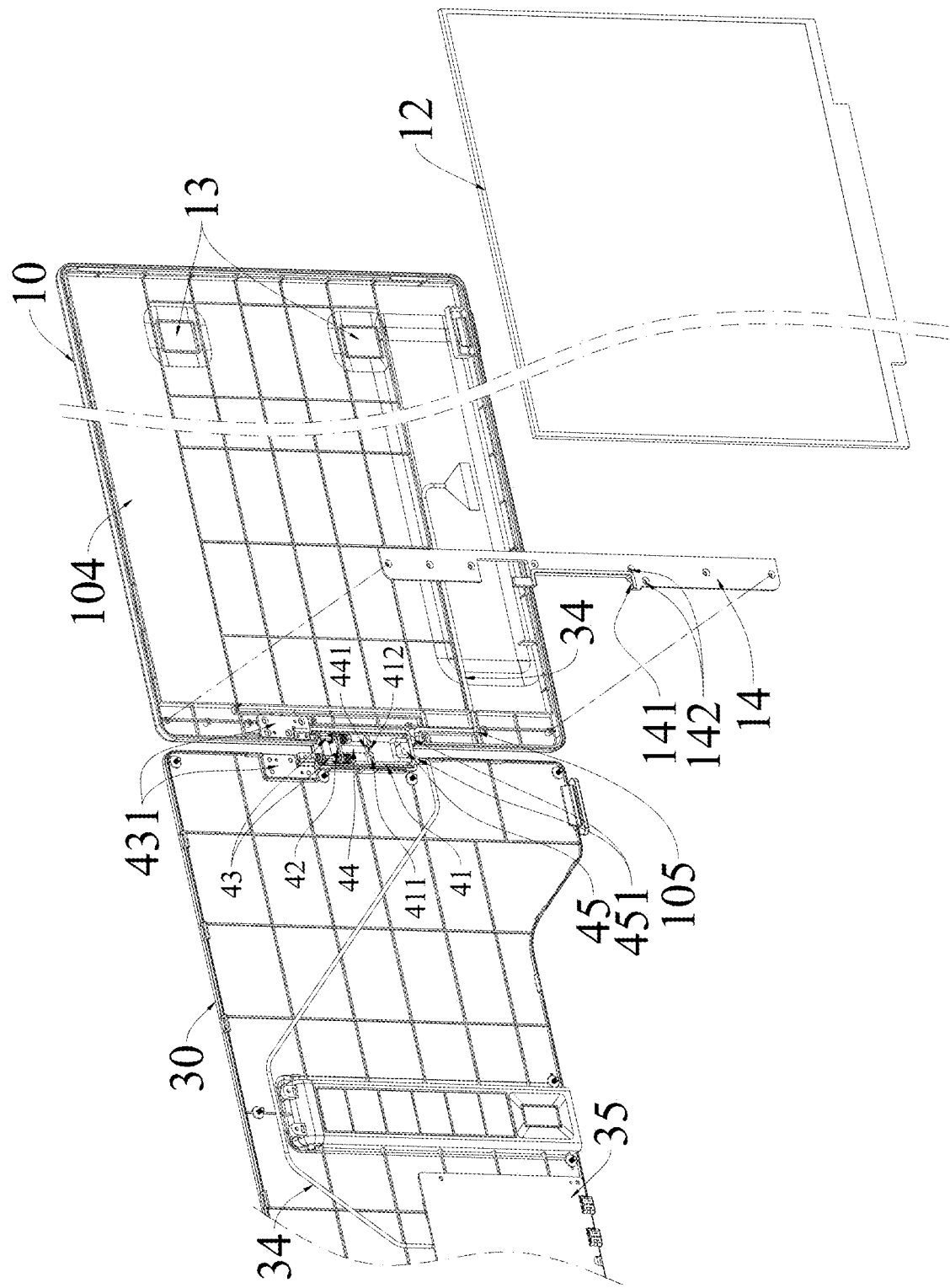
FIG. 8 is an internal structure view of the first screen and the middle bracket (front view).

In some embodiments, the first biaxial hinge assembly 40 includes a barrel-shaped shell 41 and a biaxial hinge 42, as shown in combination in FIGS. 7 and 8. The biaxial hinge 42 may be a biaxial hinge used on common laptop computers, and these biaxial hinges 42 may be obtained by external purchase. A part of the biaxial hinge 42 is placed in the shell 41 and is fixedly connected to the shell 41. Specifically, as shown in FIGS. 7 and 8, the biaxial hinge 42 is provided with one middle barrel 44, the middle barrel 44 being provided with an internally threaded hole 441 at one end, and the shell 41 is provided internally with a fixing plate 411, the fixing plate 411 being provided with a through hole 412 in the center, wherein the internally threaded hole 441 of the middle barrel 44 is opposite the through hole 412, and a screw passes through the through hole 412 and is then screwed into the internally threaded hole 441 to form a fixed connection between the middle barrel 44 and the fixing plate 411, i.e., to cause the biaxial hinge 42 to form a fixed connection with the shell 41. An upper portion of the biaxial hinge 42 protrudes from the shell 41, and connecting plates 431 at the outer ends of the two rotating shafts 43 of the biaxial hinge 42 are fixedly connected to the first screen 10 and the middle plate member 30 by a plurality of screws, respectively.

In some embodiments, the first biaxial hinge assembly 40 further includes a port member 45, as shown in combination in FIGS. 7 and 8. The port member 45 is inserted into the shell 41 and is fixedly connected to the shell 41 by a screw 452, and the port member 45 is disposed at an opposite end from the biaxial hinge 42. The port member 45 is provided with two rotating barrels 451 parallel to each other, wherein the rotating barrels 451 are inserted into the first screen 10 and the middle plate member 30 to form rotational connections, respectively. The rotating barrels 451 are in one-to-one correspondence with the rotating shafts 43 of the biaxial hinge 42 and the rotating barrels 451 are co-axial with the corresponding rotating shafts 43, and the rotating barrels 451 and the rotating shafts 43 of the biaxial hinge 42 together function to enhance the rotational stability of the first screen 10. In addition, a wire harness 34 connected between the first screen 10 and the middle plate member 30 passes through the two rotating barrels 451 in sequence so that the wire harness 34 need not to be exposed and so that the relative rotation of the first screen 10 does not influence the wire harness 34. The wire harness 34 connects a main control circuit board 35 and a display panel 12 inside the first screen 10 to transmit electrical energy and data. In addition, as shown in FIG. 7, a guide groove 303 is provided on the inner surface of the front shell 302 of the middle plate member 30, the guide groove 303 being used to guide the direction of the wire harness 34 and to fix the wire harness 34. Similarly, as shown in FIG. 8, a guide groove 105 for guiding the wire harness 34 is also provided in the inner surface of the rear shell 104 of the first screen 10.

In some embodiments, as shown in FIG. 8, there is an elongate first pressing plate 14 fixed internally in one side of the first screen 10 that is connected to the first biaxial hinge assembly 40. The first pressing plate 14 extends along a length direction of the rotating shaft 43 of the biaxial hinge 42. The first pressing plate 14 is provided with a circular arc groove 141 at a position corresponding to the rotating barrels 451, wherein an inner wall of the circular arc groove 141 abuts outer walls of the rotating barrels 451. In addition, as shown in FIG. 8, the circular arc groove 141 is provided with perforations 142 on both a side in a horizontal direction and a side in a vertical direction, screws passing through the perforations 142 being screwed into the rear shell 104 of the first screen 10 to fixedly connect the first pressing plate 14 and the rear shell 104 of the first screen 10. The circular arc groove 141 can then fix the rotating barrels 451 so that the barrels 451 can only rotate about their own axes, thereby preventing the barrels 451 from wobbling relative to the first screen 10. In addition, when the first pressing plate 14 is fixed to the inner surface of the rear shell 104 of the first screen 10, the guide groove 105 is covered by the first pressing plate 14 and the wire harness 34 within the guide groove 105 is confined therein so that the wire harness 34 does not easily leave the guide groove 105.

Figure 9:
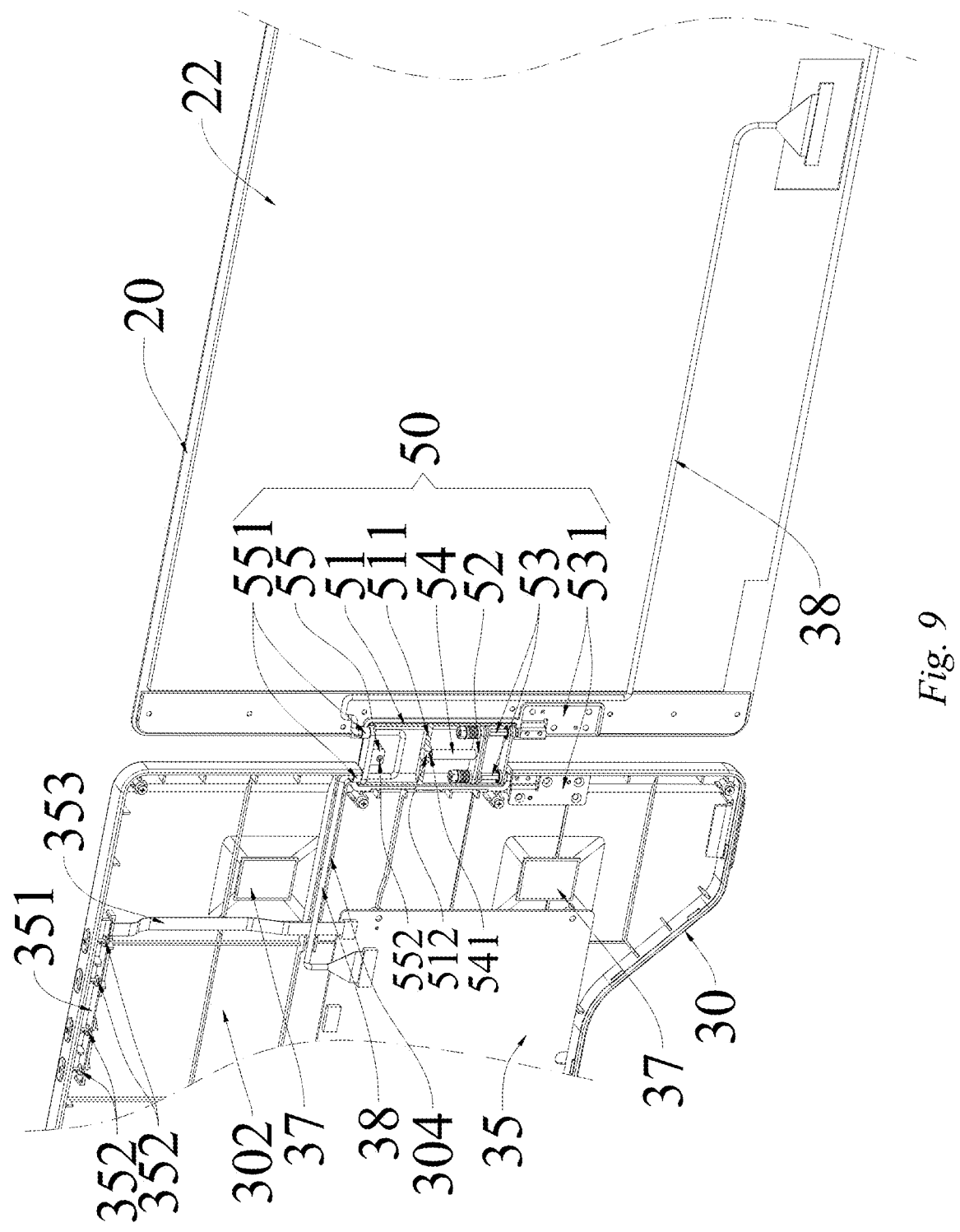
FIG. 9 is an internal structure view of a second screen and the middle bracket (rear view).
Figure 10:
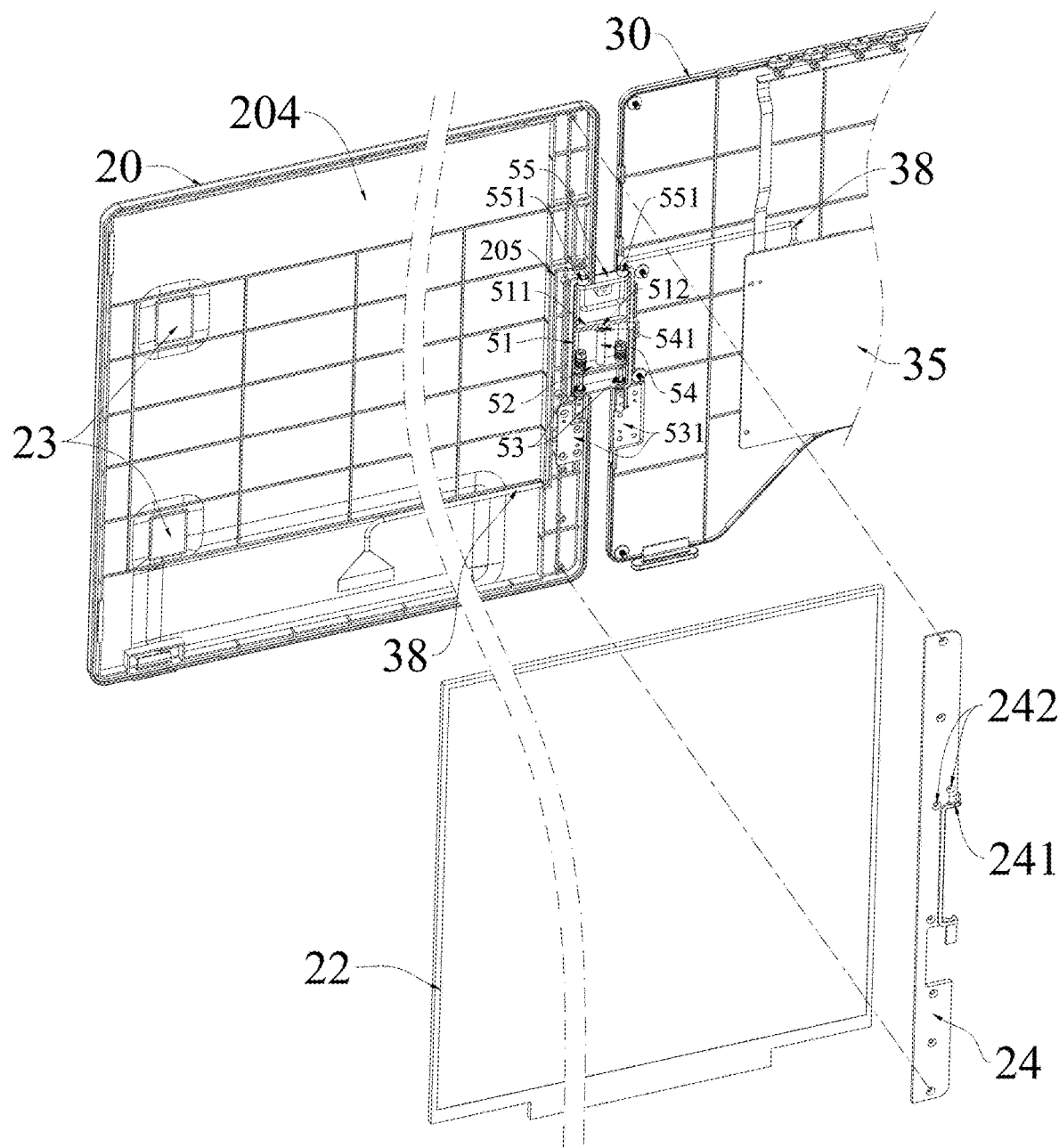
FIG. 10 is an internal structure view of the second screen and the middle bracket (front view).

In some embodiments, the second biaxial hinge assembly 50 includes a barrel-shaped shell 51 and a biaxial hinge 52, as shown in combination in FIGS. 9 and 10. The biaxial hinge 52 may be a biaxial hinge used on common laptop computers, and these biaxial hinges 52 may be obtained by external purchase. A part of the biaxial hinge 52 is placed in the shell 51 and is fixedly connected to the shell 51. Specifically, as shown in FIGS. 9 and 10, the biaxial hinge 52 is provided with one middle barrel 54, the middle barrel 54 being provided with an internally threaded hole 541 at one end, and the shell 51 is provided internally with a fixing plate 511, the fixing plate 511 being provided with a through hole 512 in the center, wherein the internally threaded hole 541 of the middle barrel 54 is opposite the through hole 512, and a screw passes through the through hole 512 and is then screwed into the internally threaded hole 541 to form a fixed connection between the middle barrel 54 and the fixing plate 511, i.e., to cause the biaxial hinge 52 to form a fixed connection with the shell 51. An upper portion of the biaxial hinge 52 protrudes from the shell 51, and connecting plates 531 at the outer ends of the two rotating shafts 53 of the biaxial hinge 52 are fixedly connected to the second screen 20 and the middle plate member 30 by a plurality of screws, respectively.

In some embodiments, the second biaxial hinge assembly 50 further includes a port member 55, as shown in combination in FIGS. 9 and 10. The port member 55 is inserted into the shell 51 and is fixedly connected to the shell 51 by a screw 552, and the port member 55 is disposed at an opposite end from the biaxial hinge 52. The port member 55 is provided with two rotating barrels 551 parallel to each other, wherein the rotating barrels 551 are inserted into the second screen 20 and the middle plate member 30 to form rotational connections, respectively. The rotating barrels 551 are in one-to-one correspondence with the rotating shafts 53 of the biaxial hinge 52 and the rotating barrels 551 are co-axial with the corresponding rotating shafts 53, and the rotating barrels 551 and the rotating shafts 53 of the biaxial hinge 52 together function to enhance the rotational stability of the second screen 20. In addition, a wire harness 38 connected between the second screen 20 and the middle plate member 30 passes through the two rotating barrels 551 in sequence so that the wire harness 38 need not to be exposed and so that the relative rotation of the second screen 20 does not influence the wire harness 38. The wire harness 38 connects a main control circuit board 35 of the middle plate member 30 and a display panel 22 inside the second screen 20 to transmit electrical energy and data. In addition, as shown in FIG. 9, a guide groove 304 is provided on the inner surface of the front shell 302 of the middle plate member 30, the guide groove 304 being used to guide the direction of the wire harness 38 and to fix the wire harness 38. Similarly, as shown in FIG. 10, a guide groove 205 for guiding the wire harness 38 is also provided in the inner surface of the rear shell 204 of the second screen 20. In addition, as shown in FIG. 9, the upper portion of the middle plate member 30 is provided with a brightness control circuit board 351 with brightness adjustment buttons 352, the brightness control circuit board 351 being electrically connected to the main control circuit board 35 via a flexible circuit board 353. Two sets of brightness adjustment buttons 352 carried in the brightness control circuit board 351 are used to adjust the display brightness of the first screen 10 and the second screen 20.

In some embodiments, as shown in FIG. 10, there is an elongate second pressing plate 24 fixed internally in one side of the second screen 20 that is connected to the second biaxial hinge assembly 50. The second pressing plate 24 extends along a length direction of the rotating shaft 53 of the biaxial hinge 52. The second pressing plate 24 is provided with a circular arc groove 241 at a position corresponding to the rotating barrels 551, wherein an inner wall of the circular arc groove 241 abuts outer walls of the rotating barrels 551. In addition, as shown in FIG. 10, the circular arc groove 241 is provided with perforations 242 on both a side in a horizontal direction and a side in a vertical direction, screws passing through the perforations 242 being screwed into the rear shell 204 of the second screen 20 to fixedly connect the second pressing plate 24 and the rear shell 204 of the second screen 20. The circular arc groove 241 can then fix the rotating barrels 551 so that the barrels 551 can only rotate about their own axes, thereby preventing the barrels 551 from wobbling relative to the second screen 20. In addition, when the second pressing plate 24 is fixed to the inner surface of the rear shell 204 of the second screen 20, the guide groove 205 is covered by the second pressing plate 24 and the wire harness 38 within the guide groove 205 is confined therein so that the wire harness 38 does not easily leave the guide groove 205.

In some embodiments, the first screen 10 shown in FIG. 8 is provided internally with 2 first magnets 13, and the second screen 20 shown in FIG. 10 is provided internally with 2 second magnets 23. The middle plate member 30 shown in FIG. 9 is provided therein with third magnets 37 corresponding to the first magnets 13. The middle plate member 30 shown in FIG. 7 is provided therein with fourth magnets 36 corresponding to the second magnets 23. During folding of the split-screen display device, when the first screen 10 is folded on the front face of the middle plate member 30, a magnetic attraction force is formed between the first magnets 13 and the third magnets 37 to hold the first screen 10, so as to prevent the first screen 10 from rotating out of place easily. When the second screen 20 is folded on the back face of the first screen 10 after the first screen 10 has been folded on the front face of the middle plate member 30, a magnetic attraction force is formed between the second magnets 23 and the fourth magnets 36 to hold the second screen 20, so as to prevent the second screen 20 from rotating out of place easily. Thus, when the split-screen display device is in a completely folded state, both the first screen 10 and the second screen 20 can be magnetically held in place so that the display faces of the two screens will not be easily exposed in the event of shaking of the split-screen display device. In other embodiments, the numbers of the first magnets, the second magnets, the third magnets, and the fourth magnets are not limited to those shown in the figures. For example, there are 1 first magnet, 1 second magnet, 1 third magnet, and 1 fourth magnet, respectively, or there are 3 first magnets, 3 second magnets, 3 third magnets, and 3 fourth magnets, respectively.

In addition, terms "first", "second", and "third" are used merely for descriptive purposes, and should not be construed as indicating or implying relative importance or implicitly specifying the number of technical features indicated. Thus, features defined with "first", "second", and "third" can explicitly or implicitly comprise one or more of the features.

In the description of the present application, the meaning of "a plurality of" is two or more, unless otherwise explicitly and specifically defined.

In the description of this specification, descriptions with reference to terms "one embodiment", "some embodiments", "an example", "a specific example", or "some examples" etc., mean specific features, structures, materials or characteristics described in conjunction with the embodiment(s) or example(s) are included in at least one embodiment or example of the present application. In this specification, the schematic representation of the above-mentioned terms should not be constructed as necessarily referring to the same embodiment or example. Moreover, the described specific features, structures, materials or characteristics may be combined in any one or more embodiments or examples in a suitable manner. In addition, those skilled in the art may combine different embodiments or examples described in this specification.

The above only uses embodiments to further illustrate the technical content of the present application, so as to make it easier for readers to understand, but it does not mean that the implementation of the present application is limited to this. Any technical extension or re-creation made in accordance with the present application is all protected by the present application. The protection scope of the present application is defined by the claims.

The invention claimed is:

1. A split-screen display device for a laptop computer, comprising a middle plate member, a first screen, and a second screen, wherein the middle plate member is used to connect the first screen and the second screen, and the first screen and the second screen are provided on the left and right sides of the middle plate member, respectively; and the middle plate member forms a hinge connection with the first screen on one side by a first biaxial hinge assembly, and the middle plate member forms a hinge connection with the second screen on the other side by a second biaxial hinge assembly, wherein when the split-screen display device is in a completely folded state, the first screen is folded on a front face of the middle plate member and a display face of the first screen faces the front face of the middle plate member, and the second screen is folded on a back face of the first screen and a display face of the second screen faces the back face of the first screen,
    wherein the first biaxial hinge assembly has two parallel rotating shafts and a distance between the two rotating shafts is a first width, and the second biaxial hinge assembly has two parallel rotating shafts and a distance between the two rotating shafts is a second width, the first width being less than the second width and a difference between the first width and the second width being not less than a thickness of the first screen.

2. The split-screen display device for a laptop computer of claim 1, wherein the middle plate member is provided with a first recess on one side and the first screen is correspondingly provided with a second recess on one side connected to the middle plate member, a part of the first biaxial hinge assembly being located in the first recess and hinged to the first recess, and a part of the first biaxial hinge assembly being located in the second recess and hinged to the second recess; and
    the middle plate member is provided with a third recess on the other side and the second screen is correspondingly provided with a fourth recess on one side connected to the middle plate member, a part of the second biaxial hinge assembly being located in the third recess and hinged to the third recess, and a part of the second biaxial hinge assembly being located in the fourth recess and hinged to the fourth recess.

3. The split-screen display device for a laptop computer of claim 1, wherein the first biaxial hinge assembly further comprises a barrel-shaped shell and a biaxial hinge, the biaxial hinge being fixedly connected to the shell, and connecting plates at outer ends of two rotating shafts of the biaxial hinge being fixedly connected to the first screen and the middle plate member, respectively.

4. The split-screen display device for a laptop computer of claim 3, wherein the first biaxial hinge assembly further comprises a port member, the port member being fixedly connected to the shell and the port member being provided at an opposite end from the biaxial hinge; and the port member being provided with two rotating barrels parallel to each other, wherein the rotating barrels are inserted into the first screen and the middle plate member to form rotational connections, respectively, and the rotating barrels are in one-to-one correspondence with the rotating shafts of the biaxial hinge and the rotating barrels are co-axial with the corresponding rotating shafts; and a wire harness connected between the first screen and the middle plate member passes through the two rotating barrels in sequence.

5. The split-screen display device for a laptop computer of claim 4, wherein there is an elongate first pressing plate fixed internally in one side of the first screen that is connected to the first biaxial hinge assembly, the first pressing plate extending along a length direction of the rotating shaft of the biaxial hinge and the first pressing plate being provided with a circular arc groove at a position corresponding to the rotating barrels, wherein an inner wall of the circular arc groove abuts outer walls of the rotating barrels, and the circular arc groove is provided with perforations on both a side in a horizontal direction and a side in a vertical direction, screws passing through the perforations being screwed into the first screen to fixedly connect the first pressing plate and the first screen.

6. The split-screen display device for a laptop computer of claim 3, wherein the biaxial hinge is provided with one middle barrel, the middle barrel being provided with an internally threaded hole at one end, and the shell is provided internally with a fixing plate, the fixing plate being provided therein with a through hole, wherein the internally threaded hole of the middle barrel is opposite the through hole and a screw passing through the through hole is screwed into the internally threaded hole to form a fixed connection.

7. The split-screen display device for a laptop computer of claim 1, wherein the second biaxial hinge assembly further comprises a barrel-shaped shell and a biaxial hinge, the biaxial hinge being fixedly connected to the shell, and connecting plates at outer ends of two rotating shafts of the biaxial hinge being fixedly connected to the second screen and the middle plate member, respectively.

8. The split-screen display device for a laptop computer of claim 7, wherein the second biaxial hinge assembly further comprises a port member, the port member being fixedly connected to the shell and the port member being provided at an opposite end from the biaxial hinge; and the port member being provided with two rotating barrels parallel to each other, wherein the rotating barrels are inserted into the second screen and the middle plate member to form rotational connections, respectively, and the rotating barrels are in one-to-one correspondence with and co-axial with the rotating shafts of the biaxial hinge; and a wire harness connected between the second screen and the middle plate member passes through the two rotating barrels in sequence.

9. The split-screen display device for a laptop computer of claim 8, wherein there is an elongate second pressing plate fixed internally in one side of the second screen that is connected to the second biaxial hinge assembly, the second pressing plate extending along a length direction of the rotating shaft of the biaxial hinge and the second pressing plate being provided with a circular arc groove at a position corresponding to the rotating barrels, wherein an inner wall of the circular arc groove abuts outer walls of the rotating barrels, and the circular arc groove is provided with perforations on both a side in a horizontal direction and a side in a vertical direction, screws passing through the perforations being screwed into the second screen to fixedly connect the second pressing plate and the second screen.

10. The split-screen display device for a laptop computer of claim 7, wherein the biaxial hinge is provided with one middle barrel, the middle barrel being provided with an internally threaded hole at one end, and the shell is provided internally with a fixing plate, the fixing plate being provided therein with a through hole, wherein the internally threaded hole of the middle barrel is opposite the through hole and a screw passing through the through hole is screwed into the internally threaded hole to form a fixed connection.

11. The split-screen display device for a laptop computer of claim 1, wherein the first screen is provided internally with at least one first magnet, the second screen is provided internally with at least one second magnet, and the middle plate member is provided therein with a third magnet corresponding to the first magnet and a fourth magnet corresponding to the second magnet, wherein when the first screen is folded on the front face of the middle plate member, a magnetic attraction force is formed between the first magnet and the third magnet to hold the first screen; and when the first screen is folded on the front face of the middle plate member and the second screen is folded on the back face of the first screen, a magnetic attraction force is formed between the second magnet and the fourth magnet to hold the second screen.

* * * * *